United States Patent
Schmidt

(10) Patent No.: US 6,726,841 B2
(45) Date of Patent: Apr. 27, 2004

(54) METHOD FOR THE PURIFICATION AND RECOVERY OF NON-GELATIN COLLOIDAL WASTE ENCAPSULATION MATERIALS

(75) Inventor: William J. Schmidt, Dresher, PA (US)

(73) Assignee: A.B. Technologies Holding, L.L.C., Dresher, PA (US)

( * ) Notice: Subject to any disclaimer, the term of this patent is extended or adjusted under 35 U.S.C. 154(b) by 0 days.

(21) Appl. No.: 09/945,770

(22) Filed: Sep. 4, 2001

(65) Prior Publication Data

US 2002/0030016 A1 Mar. 14, 2002

Related U.S. Application Data

(63) Continuation-in-part of application No. 09/385,405, filed on Aug. 30, 1999, which is a continuation-in-part of application No. 09/383,703, filed on Aug. 26, 1999, now abandoned, which is a continuation-in-part of application No. 09/259,726, filed on Mar. 1, 1999, now abandoned, which is a continuation-in-part of application No. 09/033,679, filed on Mar. 3, 1998, now Pat. No. 5,945,001.

(51) Int. Cl.⁷ .............................................. B01D 61/14
(52) U.S. Cl. ................. 210/634; 210/650; 210/773; 210/774; 210/781; 210/799; 210/800; 210/805; 210/806

(58) Field of Search ................. 210/634, 649, 210/650, 651, 652, 773, 774, 781, 799, 800, 805, 806

(56) References Cited

U.S. PATENT DOCUMENTS

| | | |
|---|---|---|
| 5,074,102 A | 12/1991 | Simpson et al. |
| 5,288,408 A | 2/1994 | Schmidt et al. |
| 5,554,385 A | 9/1996 | Stroud |
| 5,817,323 A | 10/1998 | Hutchinson et al. |
| 6,193,999 B1 | 2/2001 | Gennadios |
| 6,214,376 B1 | 4/2001 | Gennadios |
| 6,238,696 B1 | 5/2001 | Wang |

FOREIGN PATENT DOCUMENTS

| | | |
|---|---|---|
| GB | 2 343 669 A | 5/2000 |
| WO | WO 01/03677 A 1 | 1/2001 |

*Primary Examiner*—Robert James Popovics
(74) *Attorney, Agent, or Firm*—Watov & Kipnes, P.C.

(57) ABSTRACT

Method for treating non-gelatin colloidal encapsulation waste materials in which the waste is combined, optionally, with a solvent capable of dissolving the non-gelatin colloidal encapsulation material, and any softening agent contained therein, and then treating the solvent layer to remove contaminants such as residual oils and/or particulates which may be present, to provide a purified and usable encapsulating material containing stream.

21 Claims, 1 Drawing Sheet

METHOD FOR THE PURIFICATION AND RECOVERY OF NON-GELATIN COLLOIDAL WASTE ENCAPSULATION MATERIALS

RELATED APPLICATIONS

The present application is a continuation-in-part application of U.S. Ser. No. 09/385,405 filed Aug. 30, 1999 which is a continuation-in-part of U.S. Ser. No. 09/383,703 filed on Aug. 26, 1999 (now abandoned), which is a continuation-in-part application of U.S. Ser. No. 09/259,726 filed Mar. 1, 1999 (now abandoned) which is a continuation-in-part of U.S. Ser. No. 09/033,679 filed on Mar. 3, 1998, now U.S. Pat. No. 5,945,001.

FIELD OF THE INVENTION

The present invention is generally directed to a process for purifying and recycling colloidal non-gelatin encapsulation waste materials and derivatives thereof and other components obtained from capsule manufacturing processes.

BACKGROUND OF THE INVENTION

Gelatin and gelatin derivatives are colloidal materials and are used to encapsulate the products of several industries. Examples are described in U.S. Pat. No. 5,074,102, issued to Simpson et al, and include the encapsulation of medicinal compounds such as drugs and vitamins; employment of gelatin encapsulation in food packaging, such as for powdered instant coffee or spices; in candy manufacturing; in fertilization of ornamental plants and/or indoor plants; in packaging of sensitive seeds in combination with protective agents and/or fertilizers; and in the packing of single dye-stuffs or mixtures of various drugs.

Due to market conditions, as discussed below, recent advances allow for encapsulation of the above recited products using materials in the form of colloids which are effective in encapsulating active agents such as drugs, vitamins, neutriceuticals and the like, hereinafter "colloidal encapsulating material(s)", which do not contain gelatin. Such non-gelatin colloidal encapsulating materials include, for example, 1) starch, starch acetate, high amylase starch, modified starch and derivatives thereof as described in U.S. Pat. No. 5,817,323, issued to Hutchinson, et al. and U.S. Pat. No. 5,554,385, issued to Stroud and U.S. Pat. No. 6,210, 1009, issued to Laba, et al., 2) kappa & iota-carrageenan and derivatives thereof as described in U.S. Pat. No. 6,214,376, issued to Gennadios and European Patent No. EP1106107, issued to Tanner, et al. and International Publication No. WO 01/03677 A1, issued to Tanner, et al., 3) cellulose, hydroxypropylmethylcellusle (HPMC) and derivatives thereof as described in U.S. Pat. No. 6,238,696, issued to Wang and UK Patent Application No. 9925166.2, issued to Brown et al. and 4) acacia gum as described in U.S. Pat. No. 6,193, 999, issued to Gennadios, or combinations thereof or in combination with gelatin. Each of the references mentioned above is incorporated herein by reference.

The replacement of gelatin by compositions derived from non-animal sources is driven by market conditions that have capsule manufacturers looking toward alternative materials that can effectively encapsulate the various products mentioned above. Some of these market conditions include: 1) the outbreak of BSE (bovine spongiform encephalopathy), or 'mad cow disease', which has resulted in government action and consumer concerns, tightening raw material supplies as more and more portions of the source material, cow bone and hide, are being banned from use; gelatin products having already been banned in France. There has been one allegation of cross-species contamination from cow to human in the United Kingdom. 2) Foot & Mouth disease outbreak in 2001 resulted in consumer concerns and reduced animal derived raw material supplies. 3) Various groups around the world that do not ingest products of pigs or beef, such as Hebrews, Muslims, Hindus and vegetarians. As raw material supplies become short and government action and consumer concerns expand, non-gelatin colloidal materials will become the preferred sources of encapsulating materials.

In addition, it may be desirable that, an encapsulated product intended for oral use, have a faster disintegration rate, to release the encapsulated product in the oral cavity. Gelatin based colloidal encapsulating materials typically have a relatively slow rate of disintegration compared to non-gelatin colloidal materials.

In each of the above-recited manufacturing and production processes, a certain amount of the encapsulating material is lost as waste. Frequently, the amount lost as waste approaches 40% or more of the total starting material, depending on the manner in which is the capsules are produced. As a result, capsule manufacturers are interested in improving production efficiency by purifying and recycling the waste for reuse.

Methods exist for the recovery and purification of waste material obtained from capsule manufacturing processes which use gelatin based colloidal encapsulating materials. Such methods suffer from a variety of shortcomings as discussed herein. However, there are no known processes for the purification and recovery of non-gelatin colloidal encapsulating materials from capsule manufacturing processes.

Before the shortcomings of waste recovery of gelatin from encapsulating materials employing the same can be fully appreciated, the composition of the encapsulation waste material itself should be further understood. In general, the waste material of encapsulation processes is comprised of a variable number of components added to a base. These components may include solvents (usually water); softening agents and oil coatings; and, contaminants in the form of residual active ingredients, i.e. the substance being encapsulated. In addition, colorings and preservatives may also be present. Thus, it can be observed that the successful recovery and recycling of the purified gelatin involves not only the recovery of the gelatin from surrounding oils, but also the removal of the remaining components of the waste as described above in order to achieve a relatively pure, reusable product.

Under typical waste recovery processes employing gelatin, extraction is the principle method for accomplishing removal of oils, actives, and the like in the pharmaceutical industry. While several solvents have been used in an effort to accomplish separation, each solvent suffer from a variety of shortcomings not the least of which is the necessity of ultimately removing yet another component, i.e. the solvent itself, from the waste material. To date, the most popular and widely used solvents used to separate gelatin from oils and actives are chlorinated solvents such as, for example, 1,1, 1,-trichloroethane with naphtha. The use of chlorinated solvents, however, is accompanied by high costs, disposal problems, and most importantly, environmental concerns.

Attempts have been made to use other solvents including isopropyl alcohol, methyl isobutyl ketone, toluene, hexane, heptane, acetone, and acetone/water mixtures, but the resulting yields are insufficient and/or the separation is poor.

Furthermore, some of these chemicals are relatively expensive and present similar environmental, disposal, and safety concerns as the chlorinated solvents. None of them have been found to separate oils and actives with a high degree of efficiency. These methods also do not address the intrinsic problem of oils trapped between the ribbons of the waste material that emerge from the encapsulation process.

U.S. Pat. No. 5,288,408, issued to Schmidt et al, discloses a method of recycling gelatin-based encapsulation waste material, and more specifically, to a process for the recovery and purification of gelatin and softening agents from the waste material. In the preferred embodiment, deionized water, is added to the gelatin waste material thereby forming an aqueous solution of gelatin and glycerin dispersed within the remaining oil and residual active-ingredient components of the waste. Filtration methods are employed under specific conditions to effect separation of the solvent (aqueous) layer from the non-solvent layer. The solvent layer is filtered under elevated temperatures to remove any remaining traces of oil or other contaminants and the filtrate is then charged to a concentration vessel adapted for vacuum distillation. The solvent (water) is thus removed under specific thermal and atmospheric conditions until the desired concentration of gelatin and glycerin is achieved. The limitation of the '408 Patent is that the recovery process described therein is confined to the processing relatively clean gelatin waste streams. The '408 Patent does not address gelatin waste materials which may contain contaminants residing in the solvent layer containing the gelatin to be recycled, that are miscible with the solvent.

U.S. Pat. No. 5,945,001, issued to Schmidt, provides an advance in the art over Schmidt, et al. (U.S. Pat. No. 5,288,408). The '001 Patent discloses a method of recycling gelatin-based encapsulation waste material, and more specifically, to a process for the recovery and purification of gelatin and softening agents therefrom. In the preferred embodiment, deionized water is added to the gelatin waste material thereby forming a solution of gelatin and glycerin dispersed within the remaining oil and residual active-ingredient components of the gelatin waste material. Filtration methods are employed under specific conditions to effect separation of the solvent (aqueous) layer from the non-solvent layer. The solvent layer is filtered under elevated temperatures to remove any remaining traces of oil or other contaminants and the filtrate is then subjected to diafiltration rather than vacuum distillation. The Schmidt '001 Patent is an advance in the art over the Schmidt et al. '408 Patent in that: 1) a more economical method of solvent removal is employed, 2) water soluble contaminants can now be removed, and 3) low molecular weight degradation products, the result of normal gelatin processing and the recovery process, can be removed. Nonetheless, both the '001 Patent and the '408 Patent are limited to a recovery process concerning relatively clean gelatin waste streams; (e.g. neither Patent addresses the removal of waste contaminants from the solvent layer, which are miscible with the solvent layer).

The '408 Patent and the '001 Patent while disclosing significant advances and a new approach to purification encapsulation waste streams to obtain recyclable components, nonetheless, had limited ability to remove some contaminants that may be present in some encapsulation waste streams.

It would be a further advance in the art of purifying and recycling waste if an in situ process could be developed that is especially effective in recovering and purifying colloidal encapsulation waste materials containing suspended particles, i.e., emulsified oil droplets or suspended particles, without thermal degradation, in a cost efficient and effective manner, especially waste streams containing non-gelatin colloidal encapsulation waste materials.

SUMMARY OF THE INVENTION

The present invention is generally directed to the purification and recovery of non-gelatin colloidal materials from a waste stream derived from capsuled manufacturing processes employing non-gelatin colloid materials as the encapsulating material. The waste stream in addition to the non-gelatin colloid material includes other components which are separated from the waste stream into solvent and non-solvent layers of which the solvent layer is then further treated in accordance with the present invention.

In one aspect of the present invention there is provided a method of treating a non-gelatin colloidal encapsulation waste material to recover non-gelatin colloidal material therefrom comprising:

a) forming a liquid containing the non-gelatin colloidal material; and b) removing contaminants from the liquid to form a product containing the non-gelatin colloidal material having a higher purity than the non-gelatin colloidal material contained in the liquid formed in step (a).

In a preferred form of the invention, step (a) comprises combining the non-gelatin colloidal encapsulating waste material with a solvent and separating the solvent layer containing the non-gelatin colloidal material from the non-solvent layer and removing contaminants from the solvent layer.

BRIEF DESCRIPTION OF THE DRAWING

The following drawing is illustrative of an embodiment of the invention and is not intended to limit the invention as encompassed by the claims forming part of the application.

DETAILED DESCRIPTION OF THE PREFERRED EMBODIMENTS

Figure 1:
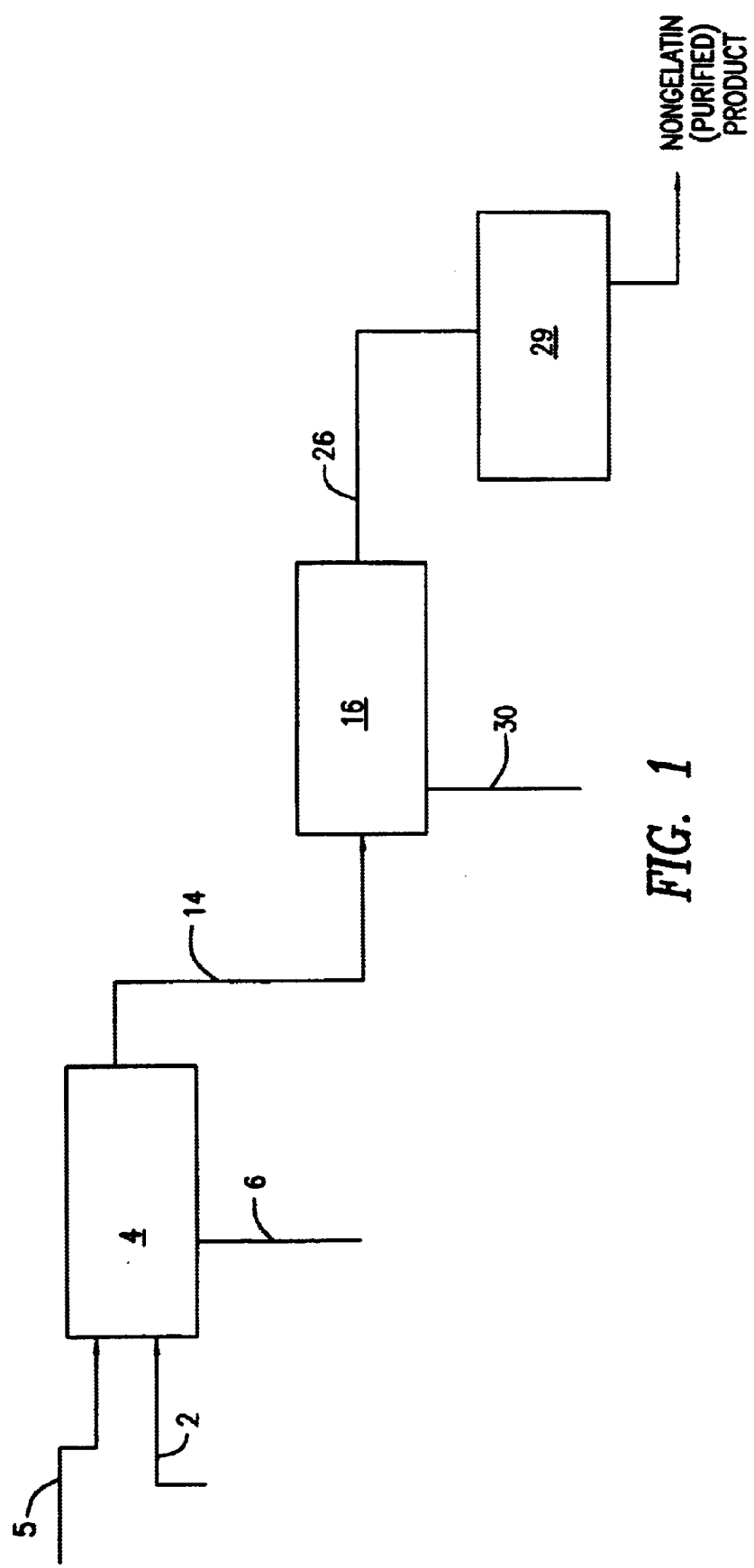
FIG. 1 is a schematic view of an embodiment of the present invention.

Examples of suitable non-gelatin colloidal materials which are recovered in accordance in with the present invention include, but are not limited to, starches, celluloses, carrageenans and gums.

Starch occurs in the leucoplasts of tubers, leaves, seeds and other portions of the plant. Sources of starch include, but is not limited to corn, rice, sorghum and potatoes. In order to withstand modern processing and storage conditions, native starches are chemically or physically modified to change their properties. Modification is usually done to develop characteristics for specialized purposes by mild degradation, cross-linking of chains, derivatizing with phosphate or other esters or pre-gelatinization of the starch.

Starches are mixtures of two polymers: amylase and amylopectin, practically insoluble in cold water or alcohol. Amylase is the constituent of starch in which anhydroglucose units are linked by a-D-1,4 glucosidic bonds to form linear chains. The level of amylase and its molecular weight vary between different types of starch. Amylase molecules are typically made from 200–2000 anhydroglucose units. Solvent solutions of amylase are very unstable due to intermolecular attraction and association of neighboring amylase molecules. This leads to an increase in viscosity, retrogradation and, under certain conditions, precipitation of amylase particles.

Amylopectin is the constituent of starch having a polymeric, branched structure. In addition to 1,4 bonds which are present in amylase and the linear segments of amylopectin, the amylopectin molecule has a-D-1,6 bonds which occur every 20–30 anhydroglucose units. Solvent solutions of amylopectin are characterized by high viscosity, clarity, stability and resistance to gelling. The level of amylopectin varies between different types of starch. Waxy starches are almost 100% amylopectin. One anhydroglucose unit has a molecular weight of 162, therefore an amylase molecule can have a molecular weight of 32,000 to 320,000.

Carrageenan is a highly refined extract of seaweed from the rhodophyta family. It is comprised of a long chain of linked galactose residues, resulting in a high molecular weight compound. The three types of commercial carrageenan are lambda, kappa and iota.

Kappa and iota carrageenan have the ability to form thermoreversable gels upon cooling of hot solvent solutions; lambda carrageenan does not jellify as it is soluble in cold water. The gelation temperature of carrageenan depends on the type of carrageenan and the types and concentration of cations, more than the concentration of the carrageenan. However, cation concentration beyond 0.2 M will weaken the gel.

With kappa-carrageenan, the strongest gels take place with $K+>Ca_2+>>Na+$ wherein $K+$ kappa-carrageenan forms a rigid, elastic gel and $Ca_2+$ kappa carrageenan gives a stiff, brittle gel. Of all carrageenans, kappa-carrageenan gives the strongest gels.

Iota-carrageenan gels most strongly with $Ca_2+>K+>Na+$, with calcium gels being resilant, having thixotropic flow and good freeze-thaw stability. Iota-carrageenans also gellify at higher temperatures than kappa-carrageenan.

Hydroxypropylmethyl cellulose (HPMC) is a derivative of cellulose, specifically a non-ionic water soluble ether of methyl cellulose that produces solutions having a wide range of viscosities. Cellulose has thermogelling properties and is more soluble than methyl cellulose.

Acacia gum is a natural exudate from acacia trees, having emulsifying and encapsulating properties. Gum Acacia contains Arabin, a compound of Arabic acid with calcium, varying amounts of the magnesium and potassium salts of the same acid being present. Small amounts of other salts may be present. Acacia gum also contains 12 to 17 per cent of moisture and a trace of sugar, and yields 2.7 to 4 per cent of ash, consisting almost entirely of calcium, magnesium and potassium carbonates.

In preparing non-gelatin colloidal encapsulating materials, softening agents are sometimes added to plasticize the encapsulation material when capsule shells are desired. Softening agents such as glycerol, sorbitol, xylitol, polyglycerol or other similar polyols, and/or derivatives thereof, are commonly employed.

The capsule-forming material may be used to enclose active components in the form of powders, liquids, or combinations thereof. Oils, such as vitamin A, vitamin E, and beta-carotene, for example, are frequently encapsulated by such encapsulation materials in the pharmaceutical, cosmetic, and nutritional industries. Lubricating oils like mineral oil or medium chain triglycerides (MCT's) may be used to coat the outer surface of the capsule during processing. Thus, it can be seen that the waste of the encapsulation process may have, in addition to the encapsulating material, a softening agent such as glycerol and other components (e.g. oily components), which must be removed before the waste is available for reuse as a relatively pure product. In some instances, coloring agents may also be incorporated into the encapsulating material mass.

Present methods of encapsulating active components employ a ribbon, or sheet of encapsulation material containing gelatin, which is then die punched to form capsules. As much as 40% or more of the encapsulation starting material containing gelatin (i.e. ribbon) is discarded as waste.

The present invention provides a novel and efficient method of purifying and recycling non-gelatin containing colloidal encapsulation materials from waste streams containing the same. It will be understood that non-gelatin colloidal materials with physical and chemical properties similar to those disclosed herein exist and may also be recycled by the present process. Similarly, glycerol is only one example of a softening agent, which may be recovered; thus, neither the non-gelatin encapsulation materials disclosed herein nor softening agent are intended to be limiting.

Reference is now made to FIG. 1 wherein an embodiment of the present invention for the purification and recovery of non-gelatin colloidal encapsulation material and/or softening agent is illustrated. A suitable solvent, such as deionized (D.I.) water is added through a conduit 2, in an amount sufficient to dissolve the waste material, typically in an amount of up to about five volumes, based on the quantity (mass) of waste material, preferably from about 0.5 to 5.0 volumes may be added to a dissolution/separation vessel 4 which may be provided with a heating jacket known in the art. The waste material, which may be preheated to a temperature of from about 30 to 100° C. to make the waste material into a convenient, flowable condition, is then charged either batch-wise or continuously via a conduit 5 to the dissolution/separation vessel 4 which may be made of stainless steel or glass-lined construction and sized according to a desired batch size. The dissolution/separation vessel 4 may also be provided with a conventional agitation device such as a stirrer (not shown). The waste material may be diluted with the solvent (e.g. deionized water) typically at atmospheric pressure under heating at a temperature from about 30 to 100° C. Agitation is performed to effect dissolution of the waste material.

A colloidal solution of the non-gelatin encapsulating material and softening agent (i.e. solvent layer) is thus formed within the remaining oily component and residual active-ingredient components. As used herein the term "solvent layer" shall mean a layer in which the components contained therein are dissolved in the solvent. The term "non-solvent layer" shall mean a layer in which the components therein do not dissolve in the solvent and therefore may be separated from the solvent layer.

The above recited dilution level gives a preferred concentration for achieving rapid and thorough separation of the non-solvent layer from the solvent layer.

Once the waste material is completely dissolved, agitation is terminated and the mass is allowed to either 1) stand to effect separation of the solvent layer from the non-solvent layer, then "decanting" one layer from the other, then further processing to remove residual oils and/or particulates or, 2) alternatively, the entire mass may be sent directly to an appropriate apparatus for separation of the solvent layer and non-solvent layer, which may contain residual oils and/or particulates.

If the mass is allowed to stand to effect separation of the oils, it has been observed that for a batch size of about 400 Kg, for example, approximately 0.5 to 1.5 hours were required for separation. Separation of the lower, solvent layer from the upper, non-solvent layer can be facilitated by a sight glass incorporated into the purifying and recycling system. Accordingly, differences between the two layers are visually determined to effect accurate separation. Alternatively, an oil skimmer may be employed to remove the non-solvent layer, as previously indicated, which is discarded, while the lower solvent layer is further processed as discussed below.

As described above, the dissolved waste material may be separated into a non-solvent layer and a solvent layer containing the non-gelatin colloidal encapsulation material and optional softening agent. If the solvent layer contains particulates and/or oily type materials, the solvent layer may then be treated to remove residual oils and/or particulates by means of separation processes as more fully described below and may optionally be treated to remove some or all of the softening agent. Again, the entire mass may be sent directly to an appropriate apparatus for separation of the solvent layer and non-solvent layer, which may contain residual oils and/or particulates. The non-solvent layer may then be discarded via a conduit 6.

The method of separation employed for the removal of residual oils and/or particulates from the solvent layer may include, but is not limited to, techniques such as centrifugation, micro-filtration and coalescers, decanting or combinations thereof. The solvent layer then proceeds via conduit 14 to one of the separators 16 as mentioned above.

Centrifugation is based on the principal that the rate of separation of two immiscible liquids, or a liquid and a solid, is increased significantly by the application of centrifugal force which can be thousands of times that of gravity. The force exerted on the liquids is directly proportional to the speed of rotation, the radius of rotation, and the mass of the liquids.

The force exerted on rotating immiscible liquids, i.e, solvent and non-solvent liquids, is described in terms of relative centrifugal force or number of g's which is expressed as multiples of the force of gravity. Centrifuges are rated by their relative centrifugal force, which can typically range from 10 to hundreds of thousands. Relative centrifugal force can be controlled by varying the speed or the centrifuge head or rotor.

As a method of separation in the subject invention, the solvent layer is maintained at a temperature sufficient to allow flow into the centrifuge; higher temperatures and/or higher dilutions may also enhance an efficient separation by reducing the viscosity of the components to be separated. A temperature of from about 30° C. to 100° C. and a dilution volume of up to 5 volumes, preferably from about 0.5 to 5 volumes of a suitable solvent, such as water, is preferred.

The efficiency of separation may be enhanced by employing a relatively high centrifugal force in the range of from about 5,000 to 25,000. The resulting, clarified solvent layer containing the non-gelatin colloidal encapsulating material and softening agent is collected for reuse and the residual oils and/or particulates are discarded. Commercial centrifugation equipment is available from companies such as Westfalia Separator U.S. in Northvale, N.J. and Alfa Laval in Warminster, Pa.

Micro-filtration refers to a method of removing small particles from a liquid. Particles as used herein include, but are not limited to, solid particulates which do not have sufficient mass to settle out of solution and/or fine emulsion droplets which do not readily separate from a liquid. Micro-filtration can be achieved through the use of an appropriate pore size filters including, but not limited to cartridge type filters and tangental flow type filters. In the present invention, cartridge filters are used only as a prefiltration step to protect the expensive, downstream tangential flow filters which are the preferred filters for the purpose of removing emulsified oils. The pore size of the preferred tangential flow filters is typically in the range of from about 0.1 and 1.0 microns. The preferred pore size of the prefiltration cartridge filter is from about 1.0 to 10 microns.

Temperature and dilution are important considerations for improving the efficiency of the separation process by varying the viscosity of the colloidal solution. A temperature of from about 30° C. to 100° C. and a dilution volume of up to 5 volumes preferably from about 0.5 to 5 volumes of a suitable solvent, such as water, is preferred.

Micro-filtration equipment is commercially available from suppliers such as Pall Filtron in Northborough, Mass. and Millipore Corporation in Bedford, Mass. or can be manufactured by a reputable engineering firm such as Hartel, Inc. of Madison Wis. or Allegheny Bradford of Bradford, Pa.

A coalescer, may be used to remove residual oils from the solvent layer. The coalescer enhances the collection of the fine oil droplets (the dispersed phase liquid) into larger droplets which will separate more easily from the solvent layer (the continuous phase liquid).

Generally, a multiple stage system may be employed to first remove particulates. Once the particulates are removed the remaining liquid may then be treated with a coalescer to remove residual oil from the colloidal solution. A temperature of from about 30° C. to 100° C. and a dilution volume of typically up to 5 volumes, preferably from about 0.5 to 5 volumes of a suitable solvent, such as water, is desirable. Commercial coalescers are readily available such as those supplied by Pall Filtron of Northborough, Mass.

The employment of the separation processes mentioned above separates residual oils and/or particulates via a conduit 30 from the solvent layer containing encapsulating material and the softening agent.

Depending on the concentration of the non-gelatin colloidal encapsulating material and softening agent in the product, the product may be returned directly to encapsulating material mass manufacturing or the product may be further concentrated by removing some of the solvent (e.g. water). For solutions requiring concentration, the colloidal solution may be charged via a conduit 26 to a concentration apparatus 29 adapted for vacuum distillation such as disclosed in Schmidt et al., U.S. Pat. No. 5,288,408, or to a diafiltration system such as disclosed in Schmidt, U.S. Pat. No. 5,945,001, each of which is incorporated herein by reference. Alternatively, the product may be subjected to short path distillation. The purified concentrated product may then be collected for reuse in capsule manufacturing.

Short path distillation for this aspect of the present invention is carried out under controlled conditions to facilitate the removal of water at a lower temperature to prevent thermal degradation of the recoverable gelatin. Evaporator temperatures typically from about 50° C. to 120° C., and typically pressures 20 to 30 in. Hg, preferably 22–28 in. Hg is employed to remove water. Such temperatures and short contact time do not cause decomposition of the encapsulating material, which affects its capsule forming strength. The water distillate is passed through a condenser to waste or recycle. The residue contains a reduced amount of solvent plus the encapsulating material and softening agent mixture for reuse.

It is understood that the above described purifying and recycling process may be incorporated into a conventional encapsulation process to provide repeated or continual purifying and recycling of non-gelatin colloidal encapsulation waste materials.

Although the present invention has been described with reference to the particular embodiments set forth herein, it is understood that the present disclosure has been made only by way of example and that numerous changes in details of construction may be resorted to without departing from the spirit and scope of the invention. Thus, the scope of the invention should not be limited by the foregoing specifications.

What is claimed is:

1. A method of treating a non-gelatin colloidal encapsulation waste material comprising, a non-gelatin colloidal encapsulation material and at least one contaminant, said method comprising:
   a) combining the non-gelatin encapsulation waste material with a solvent to form a liquid containing the non-gelatin colloidal encapsulation waste material and said at least one contaminant;
   b) separating the liquid into a solvent layer and a non-solvent layer; and
   c) removing said at least one contaminant from at least one of the solvent layer and non-solvent layer to form a non-gelatin colloidal encapsulation material having a higher purity than the non-gelatin colloidal encapsulation material contained in the liquid formed in step (a) as the result of the removal of said at least one contaminant.

2. The method of claim 1 comprising removing the at least one contaminant from the solvent layer.

3. The method of claim 2 wherein the solvent is water.

4. The method of claim 2 comprising dissolving the non-gelatin colloidal encapsulation waste material with up to 5 volumes of said solvent.

5. The method of claim 4 wherein the step of dissolving the non-gelatin colloidal encapsulation waste material is carried out at a temperature of from about 30° C. to 100° C.

6. The method of claim 2 further comprising removing at least some of the solvent from the solvent layer.

7. The method of claim 6 wherein the step of removing the solvent is selected from the group consisting of vacuum distillation, diafiltration and short path distillation.

8. The method of claim 7 wherein the step of removing the solvent comprises short path distillation at an evaporator temperature of from about 50 to 120° C.

9. The method of claim 8 where the step of removing the solvent by short path distillation is conducted at a pressure of from about 20 to 30 in. Hg.

10. The method of claim 2 wherein the non-gelatin colloidal encapsulation waste material contains a softening agent, said softening agent being separated into the solvent layer.

11. The method of claim 10 wherein the softening agent is selected from a group consisting of glycerol, xylitol, manitol, sorbitol, polyglycerol and derivatives thereof.

12. The method of claim 10 further comprising removing at least some of the softening agent from the solvent layer.

13. The method of claim 1 wherein the step of removing said at least one contaminant is selected from the group consisting of centrifugation, micro-filtration, coalescence, decanting, or combinations thereof.

14. The method of claim 13 wherein the step of removing said at least one contaminant is carried out at a temperature of from about 30° C. to 100° C.

15. The method of claim 13 wherein centrifugation is carried out at a centrifugal force of from about 5,000 to 25,000 g.

16. The method of claim 13 wherein micro-filtration is carried out using a pore size of from about 0.1 to 1.0 microns.

17. The method of claim 1 wherein the non-gelatin colloidal encapsulation material is selected from the group consisting of starches, carrageenans, celluloses, gums and combinations thereof.

18. The method of claim 17 wherein the cellulose is hydroxypropylmethyl cellulose and derivatives thereof.

19. The method of claim 17 wherein the gum is acacia gum.

20. The method of claim 17 wherein the carrageenan is selected from the group consisting of Iota-carrageenan, kappa-carrageenan and mixtures thereof.

21. The method of claim 17 wherein the starches are selected from the group consisting of starch acetate, starch, modified starch and derivatives thereof, high amylase starch and combinations thereof.

* * * * *